(12) United States Patent
Northey et al.

(10) Patent No.: US 8,950,877 B2
(45) Date of Patent: Feb. 10, 2015

(54) SECURITY MARKINGS IN RETROREFLECTIVE SHEETING

(75) Inventors: Paul J. Northey, Somerset, WI (US); Bruce D. Orensteen, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 341 days.

(21) Appl. No.: 13/509,374

(22) PCT Filed: Nov. 10, 2010

(86) PCT No.: PCT/US2010/056253
§ 371 (c)(1),
(2), (4) Date: May 31, 2012

(87) PCT Pub. No.: WO2011/060081
PCT Pub. Date: May 19, 2011

(65) Prior Publication Data
US 2012/0229898 A1    Sep. 13, 2012

Related U.S. Application Data

(60) Provisional application No. 61/260,704, filed on Nov. 12, 2009.

(51) Int. Cl.
*G02B 5/124*    (2006.01)
(52) U.S. Cl.
CPC ..................... *G02B 5/124* (2013.01)
USPC ........................................................ 359/530
(58) Field of Classification Search
CPC ............ G02B 5/04; G02B 5/045; G02B 5/12; G02B 5/122; G02B 5/124; G02B 5/128; G02B 5/136
USPC .................................................. 359/529, 530
See application file for complete search history.

(56) References Cited

U.S. PATENT DOCUMENTS

| | | |
|---|---|---|
| 3,154,872 A | 11/1964 | Nordgren |
| 3,632,695 A | 1/1972 | Howell |
| 3,801,183 A | 4/1974 | Sevelin |
| 4,025,159 A | 5/1977 | McGrath |
| 4,082,426 A | 4/1978 | Brown |
| 4,099,838 A | 7/1978 | Cook |
| 4,202,600 A | 5/1980 | Burke |
| 4,588,258 A | 5/1986 | Hoopman |
| 4,634,220 A | 1/1987 | Hockert |
| 4,656,072 A | 4/1987 | Coburn, Jr. |
| 4,775,219 A | 10/1988 | Appeldorn |
| 4,983,436 A | 1/1991 | Bailey |
| 5,064,272 A | 11/1991 | Bailey |
| 5,066,098 A | 11/1991 | Kult |

(Continued)

FOREIGN PATENT DOCUMENTS

| | | |
|---|---|---|
| WO | WO 99/36806 | 7/1999 |
| WO | WO 03/055692 | 7/2003 |

(Continued)

*Primary Examiner* — Euncha Cherry (57) ABSTRACT

Retroreflective sheeting includes a first portion of prismatic retroreflective sheeting having a first cube corner structure that creates a first visual feature in the retroreflective sheeting and a second portion of prismatic retroreflective sheeting having a second cube corner structure that differs from the first cube structure and that creates a second visual feature in the sheeting. The second visual feature in the retroreflective sheeting forms a security mark.

27 Claims, 3 Drawing Sheets

(56) References Cited

U.S. PATENT DOCUMENTS

| | | | |
|---|---|---|---|
| 5,069,964 | A | 12/1991 | Tolliver |
| 5,156,863 | A | 10/1992 | Pricone |
| 5,262,225 | A | 11/1993 | Wilson |
| 5,591,527 | A | 1/1997 | Lu |
| 5,691,846 | A | 11/1997 | Benson, Jr. |
| 5,706,132 | A | 1/1998 | Nestegard |
| 5,759,468 | A | 6/1998 | Smith |
| 5,770,124 | A | 6/1998 | Marecki |
| 5,940,212 | A | 8/1999 | Johnson |
| 6,024,455 | A | 2/2000 | O'Neil |
| 6,120,636 | A | 9/2000 | Nilsen |
| 6,120,882 | A | 9/2000 | Faykish |
| 6,470,610 | B1 | 10/2002 | Northey |
| 6,628,439 | B2 | 9/2003 | Shiozawa |
| 6,632,695 | B2 | 10/2003 | Beierlein |
| 7,068,434 | B2 | 6/2006 | Florczak |
| 7,336,422 | B2 | 2/2008 | Dunn |
| 2003/0235674 | A1* | 12/2003 | Carlson et al. ............... 428/98 |
| 2005/0258637 | A1 | 11/2005 | Bi |
| 2005/0279235 | A1 | 12/2005 | Barthram |
| 2008/0212181 | A1 | 9/2008 | Wu |
| 2008/0212182 | A1 | 9/2008 | Nilsen |
| 2008/0231976 | A1 | 9/2008 | Commander |
| 2009/0142486 | A1 | 6/2009 | Hannington |

FOREIGN PATENT DOCUMENTS

| | | |
|---|---|---|
| WO | WO 2004/062938 | 7/2004 |
| WO | WO 2006-095161 | 9/2006 |

* cited by examiner

SECURITY MARKINGS IN RETROREFLECTIVE SHEETING

CROSS REFERENCE TO RELATED APPLICATIONS

This application is a national stage filing under 35 U.S.C. 371 of PCT/US2010/056253, filed Nov. 10, 2010, which claims priority to Provisional Application No. 61/260,704, filed Nov. 12, 2009, the disclosure of which is incorporated by reference in its/their entirety herein.

The present application relates generally to novel optically active articles; methods of making and using same; and systems in which the articles may be used. The present application more specifically relates to security markings in retroreflective sheeting. Exemplary uses of such retroreflective sheeting include, for example, signs and license plates.

BACKGROUND

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Due to the symmetrical geometry of beaded retroreflectors, microsphere based sheeting exhibits the same light return regardless of orientation, i.e., when rotated about an axis normal to the surface of the sheeting. For this reason, it is said that the distribution of light returned by beaded retroreflective sheeting is generally rotationally symmetric. Thus when viewing or measuring the coefficient of retroreflection (expressed in units of candelas per lux per square meter or Ra) at presentation angles from 0 to 360 degrees, or when measuring at orientation angles from 0 to 360, there is relatively little variation in the retroreflectivity of beaded sheeting. For this reason, such microsphere-based sheeting has a relatively low sensitivity to the orientation at which the sheeting is placed on a surface. In general, however, such sheeting has a lower retroreflective efficiency than cube corner sheeting.

Cube corner retroreflective sheeting, sometimes referred to as "prismatic" sheeting, typically comprises a thin transparent layer having a substantially planar first surface and a second structured surface comprising a plurality of geometric structures, some or all of which include three reflective faces configured as a cube corner element. Cube corner retroreflective sheeting is commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroforming to produce tooling for forming cube corner retroreflective sheeting by processes such as embossing, extruding, or cast-and-curing. U.S. Pat. No. 5,156,863 (Pricone et al.) provides an illustrative overview of a process for forming tooling used in the manufacture of cube corner retroreflective sheeting. Known methods for manufacturing the master mold include pin-bundling techniques, direct machining techniques, and techniques that employ laminae. These microreplication processes produce a retroreflective sheeting with prismatic structures that have been precisely and faithfully replicated from a microstructured tool having a negative image of the desired prismatic structure.

Prismatic retroreflective sheeting, in contrast to beaded retroreflective sheeting, is generally rotationally asymmetric. Thus when viewing or measuring Ra at presentation angles from 0 to 360 degrees, or when measuring at orientation angles from 0 to 360, there is significant variation in the retroreflectivity of prismatic sheeting. For this reason, prismatic sheeting has a higher sensitivity to the orientation at which the sheeting is placed on a surface than beaded sheeting.

Modification of prismatic sheeting by canting cubes is described, for example, in U.S. Pat. No. 4,588,258 (Hoopman). When the cubes along one groove are canted, retroreflectivity generally increases at larger entrance angles along an axis perpendicular to that groove. Retroreflectivity tends to decrease at larger entrance angles at orientations that are not close to the axis perpendicular to that groove. Thus canted sheeting tends to have increased variation in retroreflectivity at a given orientation angle. For this reason, canted sheeting is especially rotationally asymmetric.

As is stated in U.S. Patent Publication No. 2009/0142486 (Hannington), "a demand exists for retroreflective materials having discernible patterns, graphics, or validation images formed thereon." Beaded sheeting having specific graphic images or marks has been used on license plates to act as a means of verifying the authenticity or valid issuance of the license plate. For example, license plates in Washington, D.C. have generally included an identifying mark imprinted in reflective sheeting since 1986. The security mark is round and appears in a repeating pattern down the center of the license plate (as evident from http://dcplates.com/Glossary.htm). The security mark can be seen clearly only when the plate is viewed at a 30 degree angle, and the mark is placed in the sheeting by its manufacturer for control purposes during the production process.

Another security mark for use on license plates using beaded sheeting is described, for example, in U.S. Pat. No. 7,068,434 (Florczak et. al.). This security mark is formed in beaded sheeting as a composite image that appears to be suspended above or below the sheeting. Because of its appearance, this type of security mark is generally referred to as a floating image.

Other types of beaded sheeting including security marks include those described, for example, in U.S. Patent Publication No. 2009/0142486 (Hannington) (relating to the inclusion of a layer of transparent microsphere lenses embedded in a spacing layer to form an image) and U.S. Pat. No. 4,634,220 (Hockert) (relating to laser irradiation of the front surface of the sheeting to form an image).

SUMMARY

In view of the progress in the field of computer-based desktop publishing, scanning, and laser-marking, the inventors of the present application were concerned that existing license plate security marks may become subject to unauthorized replication. In at least some implementations, it may be desirable to have the security mark observable by the unaided eye when the viewer is head-on looking at the license plate or sheeting from a distance of between about 1 foot and about 30 feet.

Consequently, the present application describes a new type of security marking for use on retroreflective sheeting. The security marking makes use of the asymmetrical properties of prismatic retroreflective sheeting to create visible features.

The disclosed sheeting may be used in a variety of applications such as securing tamperproof images in security documents, passports, identification cards, financial transaction cards (e.g., credit cards), license plates, or other signage.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Preferred security features are difficult to copy by hand and/or by machine or are manufactured using secure and/or difficult to obtain materials.

The term "security mark" refers to an element on or in a retroreflective film that is surrounded by a background visual appearance. In many embodiments the security mark is an "island" feature surrounded by a continuous (or "ocean") background appearance. The security mark can change appearance to a viewer as the viewer changes their point of view of the security mark.

The present disclosure relates to a security markings in retroreflective sheeting. In particular, the present disclosure relates to security markings formed by asymmetrical reflectance properties of prismatic films to create visible features that vary with viewing angle. The security mark and the surrounding area of the retroreflective film have light reflectance patterns that do not "match up". Thus the security mark and the surrounding area have different retroreflectivity and different visual appearance at some viewing angles. While the present disclosure is not so limited, an appreciation of various aspects of the disclosure will be gained through a discussion of the examples provided below.

Two types of retroreflective sheeting are microsphere-based sheeting and cube corner-based sheeting. Microsphere-based sheeting, sometimes referred to as "beaded sheeting," is well known to the art and includes a multitude of microspheres typically at least partially embedded in a binder layer, and associated specular or diffuse reflecting materials (such as metallic vapor or sputter coatings, metal flakes, or pigment particles). Illustrative examples of microsphere-based sheeting are disclosed in U.S. Pat. No. 4,025,159 (McGrath); U.S. Pat. No. 4,983,436 (Bailey); U.S. Pat. No. 5,064,272 (Bailey); U.S. Pat. No. 5,066,098 (Kult); U.S. Pat. No. 5,069,964 (Tolliver); and U.S. Pat. No. 5,262,225 (Wilson).

Due to the symmetrical geometry of beaded retroreflectors, microsphere based sheeting exhibits the same light return regardless of orientation, i.e., when rotated about an axis normal to the surface of the sheeting. For this reason, it is said that the distribution of light returned by beaded retroreflective sheeting is generally rotationally symmetric. Thus when viewing or measuring Ra at presentation angles from 0 to 360 degrees, or when measuring at orientation angles from 0 to 360, there is relatively little variation in the retroreflectivity of beaded sheeting.

Cube corner sheeting, sometimes referred to as prismatic sheeting typically includes a multitude of cube corner elements to retroreflect incident light. Cube corner retroreflectors can include a sheet having a generally planar front surface (i.e., front side) and an array of cube corner elements protruding from the back surface (i.e., back side). Cube corner reflecting elements include generally trihedral structures that have three approximately mutually perpendicular lateral faces meeting in a single corner—a cube corner. In use, the retroreflector is arranged with the front surface disposed generally toward the anticipated location of intended observers and the light source. Light incident on the front surface enters the sheet and passes through the body of the sheet to be reflected by each of the three faces of the elements, so as to exit the front surface in a direction substantially toward the light source. In the case of total internal reflection, the back side air interface must remain free of dirt, water and adhesive and therefore is enclosed by a sealing film. The light rays are typically reflected at the lateral faces due to total internal reflection, or by reflective coatings, as previously described, on the backside of the lateral faces. Preferred polymers for cube corner sheeting include poly(carbonate), poly(methylmethacrylate), poly(ethyleneterephthalate), aliphatic polyurethanes, as well as ethylene copolymers and ionomers thereof. Cube corner sheeting may be prepared by casting directly onto a film, such as described in U.S. Pat. No. 5,691,846 (Benson). Preferred polymers for radiation cured cube corners include cross linked acrylates such as multifunctional acrylates or epoxies and acrylated urethanes blended with mono- and multifunctional monomers. Further, cube corners such as those previously described may be cast on to plasticized polyvinyl chloride film for more flexible cast cube corner sheeting. These polymers are preferred for one or more reasons including thermal stability, environmental stability, clarity, excellent release from the tooling or mold, and capability of receiving a reflective coating.

Prismatic retroreflective sheeting can be manufactured as an integral material, e.g., by embossing a preformed sheet with an array of cube corner elements or by casting a fluid material into a mold. Alternatively, retroreflective sheeting can be manufactured as a layered product by casting the cube corner elements against a preformed film or by laminating a preformed film to preformed cube corner elements. The cube corner elements can be formed on a polycarbonate film approximately 0.5 mm thick having an index of refraction of about 1.59. Useful materials for making retroreflective sheeting are preferably materials that are dimensionally stable, durable, weatherable, and readily formable into the desired configuration. Generally any optically transmissive material that is formable, typically under heat and pressure, can be used. The sheeting can also include colorants, dyes, UV absorbers or separate UV absorbing layers, and other additives as needed. A backing layer sealing the cube corner elements from contaminants can also be used, together with an adhesive layer.

The term "sheeting" generally refers to articles which have a thickness on the order of about 1 mm or less and which in large samples can be wound tightly into a roll for ease of transportation.

The security mark described herein can be formed with prismatic retroreflective sheeting forming either the security mark feature or the background surrounding the security mark. In some embodiments beaded retroreflective sheeting can be utilized with the prismatic retroreflective sheeting to form the security mark.

In many embodiments, the retroreflective sheeting described herein includes a first portion of prismatic retroreflective sheeting having a first cube corner structure that creates a first visual feature in the retroreflective sheeting and a second portion of prismatic retroreflective sheeting having a second cube corner structure that differs from the first cube structure and that creates a second visual feature in the sheeting. The second visual feature in the retroreflective sheeting forming a security mark.

The different visual feature can include, retroreflectance at a given orientation, entrance or observation angle, brightness at a given orientation, entrance or observation angle, whiteness at a given orientation, entrance or observation angle, and rotational symmetry, for example. These visual features can be created by having a first portion that includes a first light divergence profile and the second portion includes a second light divergence profile, and the first light divergence profile is visually different than the second light divergence profile. The term "divergence profile" is described in U.S. Pat. No. 4,775,219 (Appledorn). In some embodiments, these visual features are created by a first portion that includes a first set of cube corner elements having a first cube size and the second portion that includes a second set of cube corner elements having a second cube size that differs from the first cube size. In some embodiments, these visual features are created by a first portion that includes a first set of cube corner elements having a first degree of cant and a second portion that includes a second set of cube corner elements having a second degree of cant that differs from the first degree of cant. In other embodiments these visual features are created by having a first portion that includes a first set of cube corner elements and the second portion includes a second set of cube corner elements, where the first and second sets of cube corner elements are truncated cube corner elements and full cube corner elements, respectively.

The security mark can be any useful mark including a shape, figure, symbol, design, letter, number, alphanumeric character, and indicia, for example.

Figure 1:
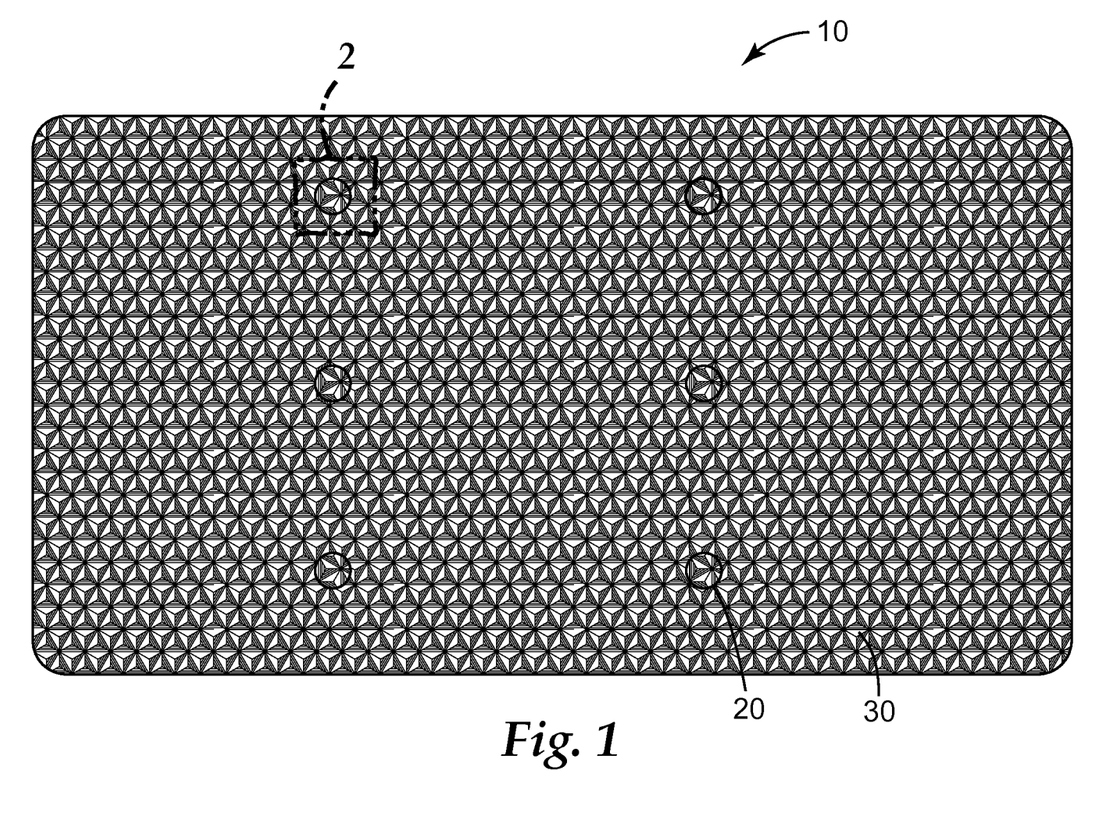
FIG. 1 is a plan view of retroreflective sheeting having a security mark.

FIG. 1 is a plan view of retroreflective sheeting 10 having a security mark. The retroreflective sheeting 10 includes a first portion 30 of prismatic retroreflective sheeting 10 having a first cube corner orientation that creates a first visual feature in the retroreflective sheeting 10 and a second portion 20 of prismatic retroreflective sheeting 10 having a second cube corner orientation that differs from the first cube corner orientation and that creates a second visual feature in the sheeting 10. The second visual feature 20 in the retroreflective sheeting forming a security mark. The second visual feature 20 can be formed with cube corner prismatic film that has been rotated relative to the first portion 30 of prismatic retroreflective sheeting 10. In many embodiments the second visual feature 20 can be formed with cube corner prismatic film that has been rotated from 10 to 90 degrees or from 30 to 90 degrees relative to the first portion 30 of prismatic retroreflective sheeting 10.

Figure 2:
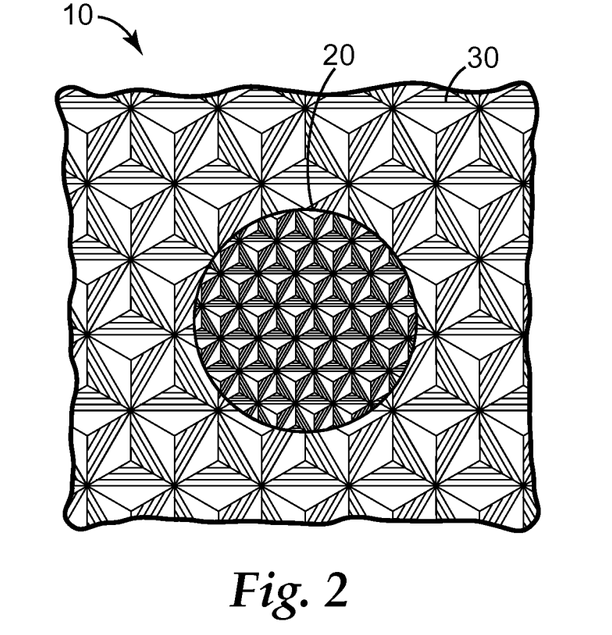
FIG. 2 is a plan view of another retroreflective sheeting having a security mark.

FIG. 2 is a plan view of another retroreflective sheeting 10 having a security mark at area 2 of FIG. 1. The retroreflective sheeting 10 includes a first portion 30 of prismatic retroreflective sheeting 10 having a first cube corner size that creates a first visual feature in the retroreflective sheeting 10 and a second portion 20 of prismatic retroreflective sheeting 10 having a second cube corner size that differs from the first cube size and that creates a second visual feature in the sheeting 10.

Figure 3:
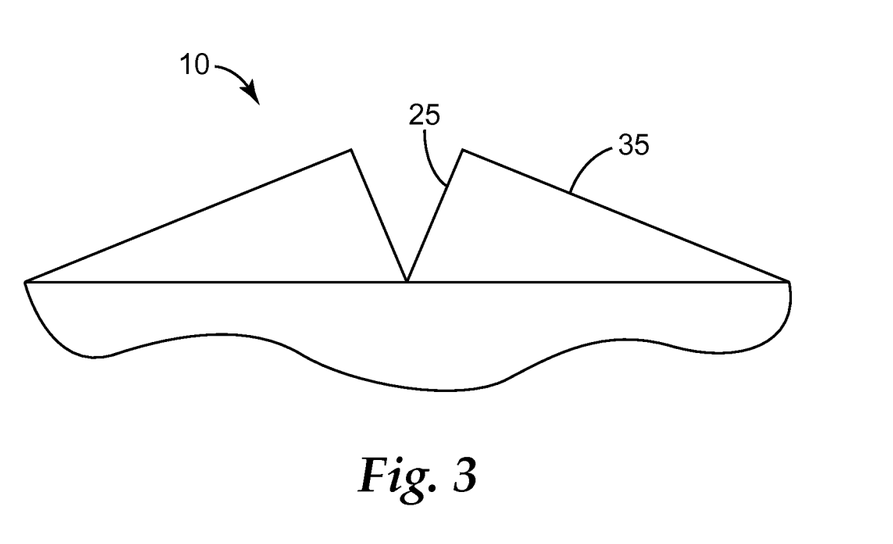
FIG. 3 is a schematic cross-sectional view of another retroreflective sheeting having a security mark.

FIG. 3 is a plan view of another retroreflective sheeting having a security mark at area 2 of FIG. 1. The retroreflective sheeting 10 includes a first portion of prismatic retroreflective sheeting 25, 35 having a first cube corner cant that creates a first visual feature in the retroreflective sheeting 10 and a second portion (not shown) of prismatic retroreflective sheeting 10 having a second cube corner cant that differs from the first cube cant and that creates a second visual feature in the sheeting 10.

The retroreflective sheeting can include a first portion of retroreflective sheeting having a first returned light pattern and a second portion of retroreflective sheeting having a second returned light pattern that differs from the first returned light pattern and that forms a security mark. The first or second portion includes prismatic sheeting.

The retroreflective sheeting can be formed from a master mold. The master mold can replicate a number of retroreflective sheeting articles utilizing known cast and cure techniques. The security mark can be formed in the master mold and replicated in the retroreflective sheeting articles formed by the master mold. The retroreflective sheeting articles can be utilized in signage and license plate articles.

In some embodiments, a method of forming the retroreflective sheeting includes forming a first mold capable of being replicated to form a first prismatic retroreflective sheeting. The first mold having a physical characteristic that correlates to a visual feature in the first prismatic retroreflective sheeting. Then the method includes forming a second mold capable of being replicated to form a second prismatic retroreflective sheeting. The second mold having a physical characteristic that correlates to a visual feature in the second prismatic retroreflective sheeting. The physical characteristic of the first mold differs from the physical characteristic of the second mold such that the visual feature of the first prismatic sheeting differs from the visual feature of the second prismatic sheeting. Then the method includes forming a master mold that includes portions of the first mold and the second mold, and then forming retroreflective sheeting using the master mold. The retroreflective sheeting including a portion made from the first mold and a portion made from the second mold and the portion of retroreflective sheeting made from the second mold forming a security mark.

In some embodiments, a method of forming retroreflective sheeting includes obtaining a first portion of retroreflective sheeting having a visual feature, and obtaining a second portion of retroreflective sheeting having a visual feature that differs from the visual feature of the first portion of retroreflective sheeting. The second portion of retroreflective sheeting having a desired shape that forms a security mark. Then the method includes placing the second portion of retroreflective sheeting adjacent to the first portion of retroreflective sheeting and adhering the first and second portions of retroreflective sheeting together. At least either the first portion or second portion of retroreflective sheeting is prismatic retroreflective sheeting. In one embodiment the method further includes forming an opening in the first portion of retroreflective sheeting and fitting into the opening in the first portion of retroreflective sheeting the second portion of retroreflective sheeting. The placing of the second portion of retroreflective sheeting adjacent to the first portion of retroreflective sheeting can involve placing the second portion of retroreflective sheeting on top of the first portion of retroreflective sheeting. Beaded sheeting can be used in combination with the prismatic sheeting.

In other embodiments, a method of forming retroreflective sheeting includes obtaining a retroreflective sheeting having a visual feature and placing a material on a portion of the retroreflective sheeting. The material alters the visual feature in the portion of the retroreflective sheeting on which the material is placed. The portion with the material forms a security feature and the first or second portion comprises prismatic sheeting.

EXAMPLES

Example 1

A 6 in (15.24 cm) by 12 in (30.48 cm) rectangular sample of a retroreflective sheeting with an adhesive layer commercially available from 3M Company, Minnesota, USA, under the trade designation SCOTCHLITE™ Diamond Grade Series 985 retroreflective sheeting was provided. The length of the rectangular sample was oriented with the machine direction of the retroreflective sheeting. A first row of openings in the sheeting was formed by cutting three vertically aligned circular discs spaced 2 in (5.08 cm) apart, each circular disc having a diameter of ⅜ in (0.952 cm). The circular discs were cut using a cork borer and removed from the sheeting. The first row was located 4 in (10.16 cm) from the left edge of the sample, and the centers of the three discs were located, respectively, 1 in (2.54 cm), 3 in (7.62 cm) and 5 in (12.7 cm) from the bottom of the sample. A second row of openings was created in the exact same manner except that the second row was located 8 in (20.32 cm) from the left edge of the sample. The six cutout discs were marked to indicate the machine direction of the retroreflective sheeting.

A retroreflective article was provided by laminating the retroreflective sheeting to a 6 in (15.24 cm) by 12 in (30.48 cm) aluminum substrate commercially available from Jupiter Aluminum Corporation, of Illinois, USA, using a powered squeeze roll applicator commercially available from Chemsultants International of Illinois, USA The retroreflective sheeting created a first visual feature.

The six cutout circular discs were placed on a table with the machine direction mark horizontally aligned. The discs were then manually rotated in a second direction, about 90 degrees to the first direction, with the aid of a portable retroviewer (commercially available from 3M Company) and at an entrance angle of approximately 30 degrees. Upon removal of a release liner, the six circular discs were manually placed into the openings they were cut from in the sheeting and adhered to the aluminum blank, maintaining the rotated orientations. The six cutout discs created a second visual feature.

Figure 4:
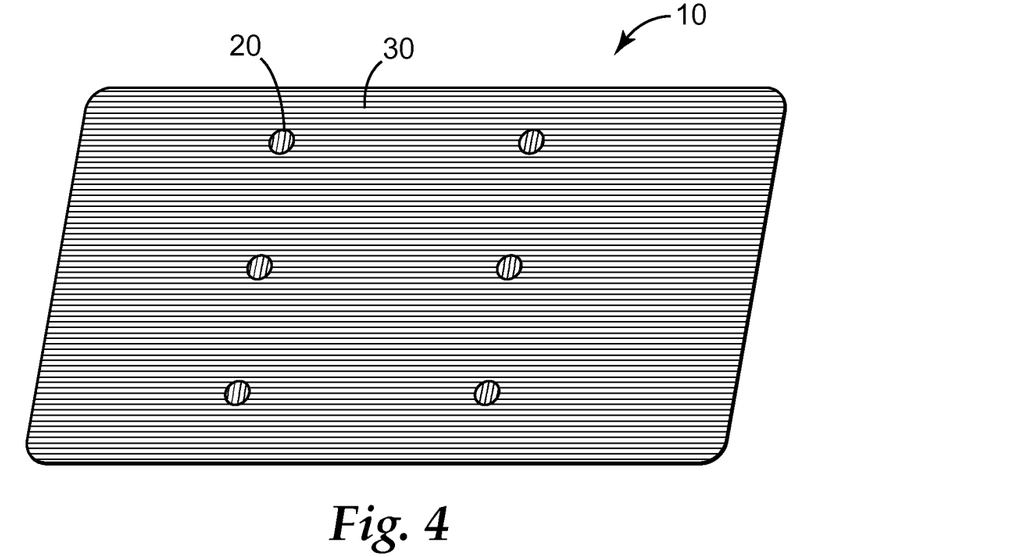
FIG. 4 is a plan view of retroreflective sheeting having a security mark of Example 1.

FIG. 4 illustrates the retroreflective article 10 described in this example. The retroreflective article 10 includes the six cutout circular discs 20 that formed the security marks surrounded by retroreflective sheeting 30.

Example 2

A retroreflective article was prepared as described in Example 1, except that the length of the rectangular sample of the sheeting was oriented with the crossweb direction. The six cutout circular discs were marked to indicate the crossweb direction of the retroreflective sheeting.

A white pattern was printed on a roll of an adhesive polymeric film commercially available from 3M Company under the trade designation "3M Clear Protective Film Series 9097" using a thermal mass transfer printer commercialized by 3M Company under the trade designation "DLP Print Station". The white pattern was created using a computer system commercialized by 3M Company under the trade designation "Graphic Design Station". The printing parameters were selected as half-tone screening with 60% fill and 45 lines per inch screening. Brightness was set to 0.75 on the Print Station. A white thermal transfer ribbon commercialized by 3M Company under the trade designation "3M Digital License plate Thermal Transfer Ribbons" and product number "TTR1321" was used.

A 6 in by 12 in rectangular sample of the white film was cut using a hand shear, and laminated to the retroreflective sheeting of the retroreflective article using the powered squeeze roll applicator.

A license plate design film was produced by printing a second roll of the adhesive polymeric film with a license plate design fitted to a 6 in by 12 in printing area. The license plate design was created using a computer system commercialized by 3M Company under the trade designation "DLP Plate Making Station", following the Mexican Hidalgo State license plate design. In this design, the background comprised Hidalgo State's colored coat of arms horizontally and vertically centered; the word "MÉXICO" written below the coat of arms in black and capital letters; and the sentence "JUNTOS CONTRIBUYENDO HIDALGO CRECE" in red located immediately below "MÉXICO". A 1.5 cm thick green stripe was located on the bottom portion and running the length of the design, with the expressions "HIDALGO (GOBIERNO DEL ESTADO)" written in white on the left portion of the stripe. A stylized "H" was printed in black and on top of the green stripe, immediately above "HIDALGO (GOBIERNO DEL ESTADO)". An oval shaped white stripe was horizontally centered in the green stripe. The left half of the oval white stripe had an inner oval stripe in red with "TRANSPORTE PRIVADO" written in white and in capital letters. The right half of the oval white stripe had the word "AUTOMÓVIL" written in black and in capital letters. The plate identifier "MEXICO" was black and centrally aligned with the license plate. "HIDALGO" in red and in capital letters was located above the plate identifier and the word "TRASERA" and "13" in black were located left of "HIDALGO". The design was printed onto the polymeric film using the thermal mass transfer printer "DLP Print Station" and thermal transfer ribbons in cyan (commercialized by 3M Company under the product number "TTR 1304"), magenta (commercialized by 3M Company under the product number "TTR 1305"), yellow (commercialized by 3M Company under the product number "TTR 1306") and black (commercialized by 3M Company under the product number "TTR 1303").

A 6 in by 12 in rectangular sample of the license plate design film was cut using a hand shear, and laminated to the white film of the retroreflective article using the powered squeeze roll applicator.

A difference in retroreflectivity (i.e., brightness) between the circular discs and the retroreflective sheeting was clearly observed with changes in entrance, and/or orientation, and/or observation angles, in the retroreflective articles of Example 1 and Example 2. This contrast is created due to the difference in the orientations of the returned light patterns by the two distinct visual features of the retroreflective sheeting and the rotated cutout circular discs. In the retroreflective article of Example 2, the contrast is observed even with two layers of printed films adhered onto the retroreflective sheeting.

Figure 5:
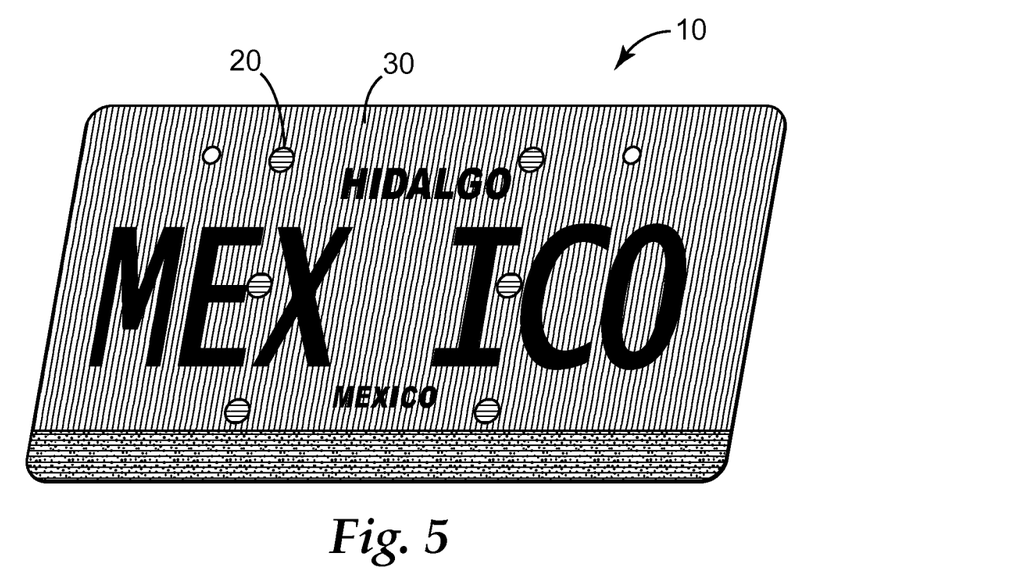
FIG. 5 is a plan view of another retroreflective sheeting having a security mark of Example 2.

FIG. 5 illustrates the retroreflective license plate 10 described in this example. The retroreflective license plate 10 includes the six cutout circular discs 20 that formed the security marks surrounded by retroreflective sheeting 30.

The recitation of all numerical ranges by endpoint is meant to include all numbers subsumed within the range (i.e., the range 1 to 10 includes, for example, 1, 1.5, 3.33, and 10).

Those having skill in the art will appreciate that many changes may be made to the details of the above-described embodiments and implementations without departing from the underlying principles thereof. Further, various modifications and alterations of the present application will become apparent to those skilled in the art without departing from the spirit and scope of the invention. The scope of the present application should, therefore, be determined only by the following claims.

What is claimed is:

1. Retroreflective sheeting, comprising:
   a first portion of prismatic retroreflective sheeting having a first cube corner structure that creates a first visual feature in the retroreflective sheeting; and
   a second portion of prismatic retroreflective sheeting having a second cube corner structure that differs from the first cube structure and that creates a second visual feature in the sheeting, the second visual feature in the retroreflective sheeting forming a security mark.

2. The retroreflective sheeting of claim 1, wherein the first portion includes a first set of cube corner elements having a first cube size and the second portion includes a second set of cube corner elements having a second cube size that differs from the first cube size.

3. The retroreflective sheeting of claim 1, wherein the first portion includes a first set of cube corner elements having a first degree of cant and the second portion includes a second set of cube corner elements having a second degree of cant that differs from the first degree of cant.

4. The retroreflective sheeting of claim 1, wherein the first portion includes a first set of cube corner elements and the second portion includes a second set of cube corner elements, and wherein the first and second sets of cube corner elements are selected from a group consisting essentially of truncated cube corner elements and full cube corner elements.

5. The retroreflective sheeting of claim 1, wherein at least one of the first visual feature and the second visual feature are selected from a group consisting essentially of retroreflectance at a given orientation, entrance or observation angle, brightness at a given orientation, entrance or observation angle, whiteness at a given orientation, entrance or observation angle, and rotational symmetry.

6. The retroreflective sheeting of claim 1, wherein the first portion includes a first set of cube corner elements having a first light divergence profile and the second portion includes a second set of cube corner elements having a second light divergence profile, and the first light divergence profile is visually different than the second light divergence profile.

7. A sign, comprising: the retroreflective sheeting of claim 1.

8. A license plate, comprising: the retroreflective sheeting of claim 1.

9. A method of forming retroreflective sheeting, comprising:
   forming a first mold capable of being replicated to form a first prismatic retroreflective sheeting, the first mold having a physical characteristic that correlates to a visual feature in the first prismatic retroreflective sheeting;
   forming a second mold capable of being replicated to form a second prismatic retroreflective sheeting, the second mold having a physical characteristic that correlates to a visual feature in the second prismatic retroreflective sheeting, the physical characteristic of the first mold differing from the physical characteristic of the second mold such that the visual feature of the first prismatic sheeting differs from the visual feature of the second prismatic sheeting;
   forming a master mold that includes portions of the first mold and the second mold; and
   forming retroreflective sheeting using the master mold, the retroreflective sheeting including a portion made from the first mold and a portion made from the second mold and the portion of retroreflective sheeting made from the second mold forming a security mark.

10. The method of claim 9, wherein at least one of the first visual feature and the second visual feature are selected from a group consisting essentially of retroreflectance at a given orientation, entrance or observation angle, brightness at a given orientation, entrance or observation angle, whiteness at a given orientation, entrance or observation angle, and rotational symmetry.

11. The method of claim 9, further comprising:
    forming a sign.

12. A method of forming retroreflective sheeting, comprising:
    obtaining a first portion of retroreflective sheeting having a visual feature;
    obtaining a second portion of retroreflective sheeting having a visual feature that differs from the visual feature of the first portion of retroreflective sheeting, the second portion of retroreflective sheeting having a desired shape that forms a security mark;
    placing the second portion of retroreflective sheeting adjacent to the first portion of retroreflective sheeting; and
    adhering the first and second portions of retroreflective sheeting together.

13. The method of claim 12, further comprising:
    forming an opening in the first portion of retroreflective sheeting; and
    fitting into the opening in the first portion of retroreflective sheeting the second portion of retroreflective sheeting.

14. The method of claim 12, wherein placing the second portion of retroreflective sheeting adjacent to the first portion of retroreflective sheeting involves placing the second portion of retroreflective sheeting on top of the first portion of retroreflective sheeting.

15. The method of claim 13, wherein the first and second portions of retroreflective sheeting are selected from a group consisting essentially of prismatic and beaded sheeting.

16. The method of claim 12, wherein at least one of the first visual feature and the second visual feature are selected from a group consisting essentially of retroreflectance at a given orientation, entrance or observation angle, brightness at a given orientation, entrance or observation angle, whiteness at a given orientation, entrance or observation angle, and rotational symmetry.

17. The method of claim 12, further comprising:
forming a license plate.

18. Retroreflective sheeting, comprising:
a first portion of retroreflective sheeting having a first visual feature;
a second portion of retroreflective sheeting having a second visual feature that differs from the first visual feature of the first portion of retroreflective sheeting, the second portion of retroreflective sheeting having a desired shape that forms a security mark and wherein the first or second portion comprises prismatic sheeting.

19. The retroreflective sheeting of claim 18, wherein the first and second portions of retroreflective sheeting are selected from a group consisting essentially of prismatic and beaded sheeting.

20. The retroreflective sheeting of claim 18, wherein at least one of the first visual feature and the second visual feature are selected from a group consisting essentially of retroreflectance at a given orientation, entrance or observation angle, brightness at a given orientation, entrance or observation angle, whiteness at a given orientation, entrance or observation angle, and rotational symmetry.

21. A method of forming retroreflective sheeting, comprising:
obtaining a retroreflective sheeting having a visual feature;
placing a material on a portion of the retroreflective sheeting, the material altering the visual feature in the portion of the retroreflective sheeting on which the material is placed, the portion with the material forming a security feature and wherein the first or second portion comprises prismatic sheeting.

22. The method of claim 21, wherein the first and second portions of retroreflective sheeting are selected from a group consisting essentially of prismatic and beaded sheeting.

23. The method of claim 21, wherein at least one of the first visual feature and the second visual feature are selected from a group consisting essentially of retroreflectance at a given orientation, entrance or observation angle, brightness at a given orientation, entrance or observation angle, whiteness at a given orientation, entrance or observation angle, and rotational symmetry.

24. The method of claim 21, further comprising:
forming a license plate.

25. Retroreflective sheeting, comprising:
a first portion of retroreflective sheeting having a first returned light pattern; and
a second portion of retroreflective sheeting having a second returned light pattern that differs from the first returned light pattern and that forms a security mark and wherein the first or second portion comprises prismatic sheeting.

26. A master mold, comprising:
a first mold portion that is capable of being replicated to form a first prismatic retroreflective sheeting, the first mold portion having a physical characteristic that correlates to a visual feature in the first prismatic retroreflective sheeting; and
a second mold portion capable of being replicated to form a second prismatic retroreflective sheeting, the second mold portion having a physical characteristic that correlates to a visual feature in the second prismatic retroreflective sheeting, the physical characteristic of the first mold portion differing from the physical characteristic of the second mold portion such that the visual feature of the first prismatic sheeting differs from the visual feature of the second prismatic sheeting;
wherein the visual feature of the second prismatic sheeting forms a security mark.

27. A method of making retroreflective sheeting, comprising:
replicating the master mold of claim 26.

* * * * *